United States Patent Office 3,300,539
Patented Jan. 24, 1967

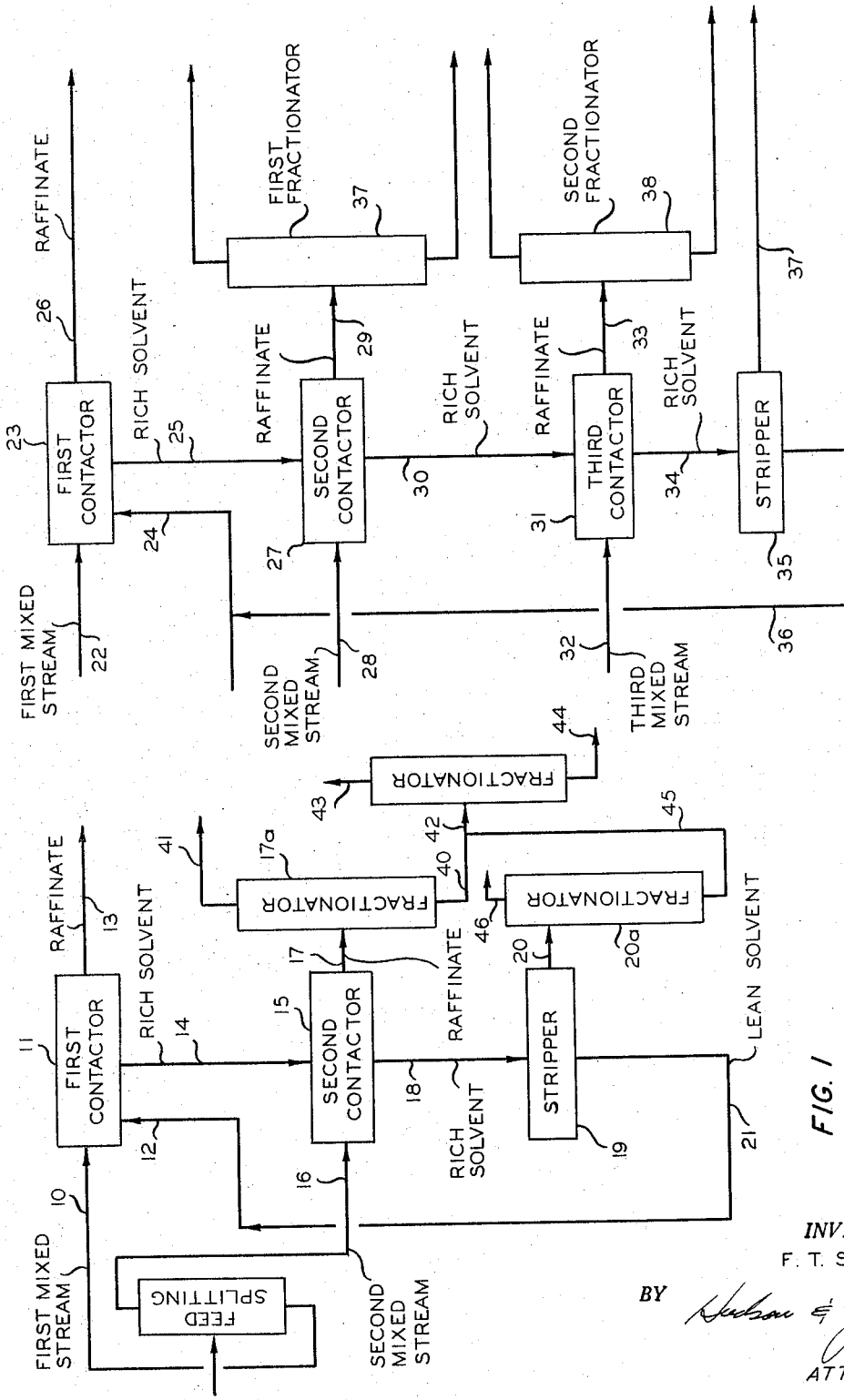

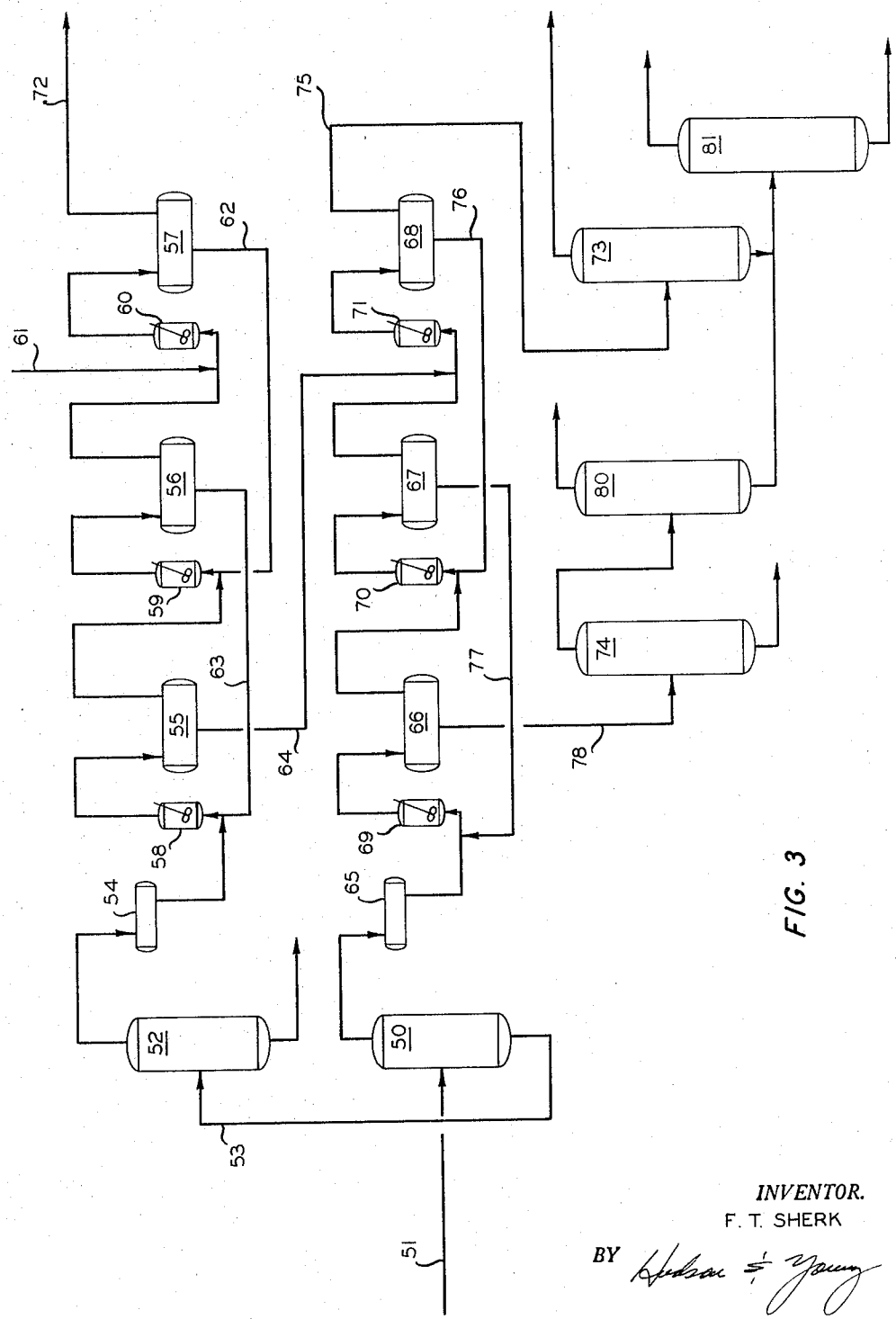

3,300,539
ISOOLEFIN RECOVERY
Fred T. Sherk, Bartlesville, Okla., assignor to Phillips Petroleum Company, a corporation of Delaware
Filed Oct. 18, 1963, Ser. No. 317,873
6 Claims. (Cl. 260—677)

This application is a continuation-in-part of my co-pending application Serial No. 72,719, filed November 30, 1960, now abandoned.

This invention relates to the recovery of isoolefins from a mixed olefin stream. In another aspect this invention relates to the recovery of at least two separate branch chain olefin components from corresponding streams of mixed olefins utilizing an absorbent having an affinity for branch chain olefins which increases as the molecular weight of the olefin decreases, performing a first absorption to recover a first isoolefin from a first stream of mixed olefins and subsequently using the rich absorbent thus obtained to recover the second isoolefin from a second stream of mixed olefins, the second isoolefin having a lower molecular weight than the first. In another aspect this invention relates to an apparatus for performing such a plural stage absorption.

Generally speaking, solvent extraction operations are well known in the art. In a liquid-liquid extraction, for example, the material to be extracted, having at least two components, is contacted with a solvent in the solvent extraction zone. There are removed from the zone a raffinate portion having a relatively high proportion of the component or components for which the solvent has a lesser affinity and an extract phase which contains the major portion of the solvent and the component for which the solvent has the greater affinity. The extract phase then must be separated into a lean solvent portion and a portion containing the component removed by the solvent, often by a stripping operation. I found that, by using as the extraction medium a material for which the selectivity is affected by the molecular weight of the component for which the medium is selective, I can perform more than one separation while requiring only a single stripping operation. Thus, using a material, for example, which is selective for branch chain olefins in preference to straight chain olefins but which is selective for the lower molecular weight of two branch chain olefins, a series of separations of branch chain from straight chain olefins can be made using a single stripping operation.

An object of this invention is to provide an improved solvent extraction operation. Another object of this invention is to increase the efficiency of a solvent extraction operation by reducing the relative amount of stripping necessary as compared with the separation accomplished. A further object of the invention is to provide an improved solvent extraction operation in which a plurality of separations of branch chain olefins from straight chain olefins are made with a single stripping operation.

Other aspects, objects and advantages of the invention are apparent from the specification, the drawing and appended claims.

According to my invention there are provided a process and apparatus comprising a solvent extraction system in which a plurality of separations of branch chain olefins from straight chain olefins are accomplished with a single stripping step by separating first a relatively high molecular weight branch chain olefin from a corresponding straight chain olefin and subsequently using the extract phase as the solvent feed to the solvent extraction zone wherein the relatively low molecular weight branch chain olefin is separated from its corresponding straight chain olefin, the lower molecular weight isoolefin causing the heavier molecular weight isoolefin to be separated as raffinate phase from the latter separation. Also, according to my invention sulfuric acid is used to extract iso amylene from a mixture of mixed amylenes and the extract phase subsequently used to extract isobutylene from mixed butylenes, the raffinate of the latter separation comprising butylene and isoamylenes. Further according to my invention sulfuric acid can be used to extract branch chain hexenes from straight chain hexenes, the rich acid used to extract branch chain amylenes from straight chain amylenes, the branch chain hexenes being removed with the straight chain amylenes, following which the rich acid is used to extract isobutylene from straight chain butylenes, the branch chain amylenes being removed as a raffinate with the straight chain butylenes, the two separate raffinate phases fractionated to separate respectively the butylene from the isoamylene and the amylene from the isohexenes, the isobutylene-rich acids stripped to produce an isobutylene product and the lean acid returned to the first mentioned solvent extraction step. My invention therefore, finds particular utility in extracting two or more of the group consisting of isobutylene, branch chain amylenes, and branch chain hexenes from the corresponding straight chain components by solvent extraction with sulfuric acid, wherein only a single stripping step is required.

When it is determined which components are to be extracted, the system is arranged so that the higher molecular weight combined stream is contacted with the lean acid, the next lower molecular weight combined stream is contacted with the rich acid from the preceding step, etc. That is, for example, in extracting branch chain hexenes from straight chain hexenes in a combined operation wherein isobutylene is extracted from the straight chain butylenes, the lean acid is first contacted with the mixed hexene stream following which the acid containing branch chain hexenes is contacted with the mixed butylene stream.

Whether the first contacting step is hexenes or amylenes the contact normally is made in a temperature range of 20 to 100° F. Preferably the step is made in the range of 45 to 65° F., more preferably in the range of 50 to 60° F.

The temperature range for absorption with an isoolefin-rich acid, for displacement of the absorbed isoolefin with a lower molecular weight isoolefin, in accordance with my invention, broadly is the temperature range for absorption of the lower molecular weight compound with a lean acid. For example, the broad range of operation for a contactor wherein isobutylene is extracted from a mixed butylene stream with sulfuric acid containing a higher molecular weight branch chain olefin is broadly the temperature range for extraction of isobutylene with lean sulfuric acid. Proper operation of a contactor wherein one branch chain olefin is displaced by another lower molecular weight branch chain olefin is obtained by control of the temperature in accordance with other conditions existing, including the relative concentrations of the branch chain olefins in question and the amounts of the feed streams. For example, in a system involving isoamylene and isobutylene, if it is desired to remove substantially all of the isoamylene from the sulfuric acid stream, a relatively high temperature is utilized, thus driving substantially all of the isoamylene and a relatively small portion of the isobutylene to the hydrocarbon phase. On the other hand, if maximum isobutylene recovery is the determining factor, a somewhat lower temperature is used, in which case a larger portion of the isobutylene remains in the acid phase, but this phase also includes an appreciable amount of isoamylene. The sulfuric acid has a preference for absorption of the lower molecular weight branch chain olefins at all temperatures, the operating temperature for a particular step being chosen in accordance with the above-noted criteria within the broad limits. The lower limit is determined by considerations of ease of mixing and contacting, considering the viscosity of the acid, and the upper limit is limited by a consideration of undesired reactions, particularly polymerization. Therefore, neither of these limits defines an absolute value on one side of which the system is completely inoperative while being 100 percent effective on the other side. Rather, there is a shading into undesirable conditions and the exact operating temperatures must be determined by an over-all balance of the factors affecting the operation. In general, all of the contacting steps are carried out within the range of 20 to 100° F. Often the extraction of a lower molecular weight branch chain olefin is made at a higher temperature than the preceding step for a higher molecular weight branch chain olefin, but this is not essential.

Normally the concentration of the sulfuric acid is in the range of 40 to 75 percent by weight. When a steam stripping step is utilized for removing the final absorbed material from the acid, usually the concentration is in the range of about 60 to 70 weight percent, more often about 65 weight percent. Steam stripping necessitates acid reconcentration. Higher acid concentration permits circulation of smaller amounts of acid. Higher concentrations are feasible because steam stripping readily removes even the most difficultly stripped material, isobutylene. Acid concentration within this range also is suitable for systems not involving isobutylene, even where hydrocarbon stripping is utilized since isoamylenes and branch chain hexenes can readily be removed even from acids of this concentration. However, when using hydrocarbon stripping in a system including an extraction of isobutylenes, acid of lower concentration, in the range of 40 to 60 weight percent, usually 50 to 55 percent, is used to permit easier removal of isobutylene. Therefore, in general, the lower portion of the acid concentration range is utilized when recovering isobutylene with a hydrocarbon stripping step whereas the upper portion of the range is utilized whenever steam stripping is used, so that more economical use of the acid can be made. Utilizing hydrocarbon stripping in a system not involving isobutylene permits wider economical variation of acid concentration.

The extraction system according to my invention is substantially insensitive to pressure variations, but should be operated at a pressure so that the various components are maintained in liquid phase. In general, the pressure is in the range of 0 to 200 p.s.i.g. Often, the selection of an exact pressure is made on the basis of considerations other than the efficiency of the absorption step per se. For example, pressures can be selected to reduce the number of pumps required.

In the drawing, FIGURE 1 is a diagrammatic flow sheet of one embodiment of the invention in which two separations are made with a single stripping operation.

FIGURE 2 is a similar representation of a system in which three separations are made.

FIGURE 3 is a schematic representation of the invention applied to two plural stage solvent extraction steps.

In FIGURE 1, the first stream to be separated is fed through feed conduit 10 into contactor 11 in which lean solvent also is fed through inlet 12. A raffinate stream is removed through conduit 13 and the rich solvent through conduit 14 which also serves as the solvent feed for a second contactor 15. Into this contactor a separate mixed stream is fed through conduit 16, this stream having a component for which the solvent is more selective than it is for the component removed in contactor 11. Thus, the raffinate removed through conduit 17 from contactor 15 will contain the dissolved product from the first extraction and the component of the second mixed stream for which the solvent is less selective while the rich solvent is removed through conduit 18 along with the product extracted from the second stream. This latter material is stripped from the solvent in stripper 19 and removed through conduit 20 while the lean solvent is returned through line 21 to contactor inlet 12 as shown. A fractionator 17A divides the stream in conduit 17. The first and second mixed streams are obtained from a feed splitting step as shown, the first stream fed through line 10 being the bottoms and the second stream through line 16 being the overhead of the splitting step.

The stream 20 can be further separated in a fractionator 20A into an overhead product comprising substantially pure product from the second contactor and a bottoms comprising undesired components entrained with the above-mentioned product. This stream is transferred to a further separation step along with the bottoms from fractionator 17A. The overhead from this fractionator contains the product which was dissolved in contactor 11 while impurities are removed in the bottoms.

In FIGURE 2, there are three separate separations made with a single stripping step. A first mixed stream enters through conduit 22 into the first contactor 23 and is contacted there with a solvent which enters through conduit 24. Raffinate is removed through conduit 26 while the rich solvent flows through conduit 25 where it enters a second contactor 27 as the solvent for a more readily absorbed component from the second mixed stream which enters through conduit 28. Raffinate is removed through conduit 29 and the solvent now rich in the component removed from the second mixed stream flows through conduit 30 to enter a third contactor 31 and to act as the solvent for a still more readily absorbed component in a third mixed stream entering through conduit 32. The raffinate from the third contactor is withdrawn through conduit 33 while the rich solvent flows through conduit 34 to stripper 35. Lean solvent flows from stripper 35 through conduit 36 where it joins fresh solvent in conduit 24 while the product removed from the solvent in stripper 35 is discharged through conduit 37. The raffinate from second contactor 27 is taken to a first fractionator 37 and the raffinate from the third conduit is taken to a second fractionator 38. In each of these fractionators a separation is made between the component of the raffinate which came from the earlier mixed stream and the component from the stream which entered first in the corresponding contactor. That is, the component which was associated with the solvent as it left the first contactor will appear in the raffinate from the second contactor along with the non-absorbed material from the second stream. The component from the second stream which is removed by the rich solvent from the second contactor appears in the raffinate from the third contactor along with the non-absorbed material from the third stream.

Two or more stages can be countercurrently used for each step of the operation. When this is done in a step wherein one isoolefin is displacing another, the rich acid from the preceding step is fed into the contacting step for the semi-lean hydrocarbon stream of the plural stage step. This results in more complete removal of the isoolefin in the rich acid from the preceding step as well as more complete extraction of the lighter isoolefin in the acid phase.

In FIGURE 3 there is illustrated a combination of process equipment adapted for processing a stream containing more than one component to be separated, and utilizing plural stage operation. The combined stream enters a first fractionator 50 through inlet conduit 51. The bottom product from fractionator 50 is fed to a second fractionator 52 through feed line 53. The overhead product from fractionator 52 is processed through an accumulator 54 and a series of contacting vessels 58, 59 and 60, having associated with these vessels respectively settling vessels 55, 56 and 57. Other types of contacting means can be used in place of vessels 58, 59 and 60, as for example, a pump and pipe loop or other type of mixing conduit. The lean absorbent is fed through conduit 61. Rich absorbent from vessel 57 is returned as lean absorbent to vessel 59 through conduit 62 while the rich absorbent from vessel 56 is returned to vessel 58 as lean absorbent through conduit 63. The rich absorbent from vessel 55 is fed to the system for treating the overhead from fractionator 50 through conduit 64. The raffinate from vessel 57 is withdrawn through conduit 72.

The accumulator 65 and contacting vessels 69, 70 and 71 and their associated settling vessels 66, 67 and 68 are connected as shown in a manner similar to the system of vessels 58, 59 and 60. The raffinate from vessel 68 is conducted to a fractionator 73 and the extract from vessel 66 is taken to stripper 74. Lean absorbent from stripper 74 can be returned to conduit 61. The overhead from stripper 74 is taken to a fractionator 80, the overhead from fractionator 80 being the desired product from the solvent extraction of the step which comprises vessels 66, 67 and 68, while the bottoms containing undesired extracted material are combined with the bottoms from fractionator 73 and taken to a fractionator 81 from which the overhead contains the extracted material from the step which comprises vessels 55, 56 and 57, while the bottom stream contains impurities.

*Example I*

In an example of the operation according to FIGURE 1, the first mixed stream which enters through conduit 10 is a stream of mixed amylenes; sulfuric acid is introduced through conduit 12. The raffinate which is removed through conduit 13 comprises a major portion of the straight chain amylenes and the stream which is removed through conduit 14 comprises the acid and the branch chain amylenes. A mixed stream of butylenes enters through conduit 16; the raffinate comprises straight chain butylenes and the branch chain amylenes while the stream removed through conduit 18 comprises the acid with the branch chain butylenes. In stripper 19, the branch chain butylenes are separated from the acid, the butylenes being removed through conduit 20 and the acid returned through line 21 to unit 12.

In the following table the feed stream results from a separation of a catalytically cracked product stream. The temperature in contactor 11 is 40° F. and the temperature in contactor 15 is 80° F. The composition of the various streams is given in this table. The pressure is approximately 175 p.s.i.a. in both contacting steps.

branch chain hexenes and the acid are removed through line 25 and then to vessel 27. The temperature in contactor 27 is 60° F. The second mixed stream which enters through conduit 28 comprises mixed amylenes and the raffinate removed through 29 comprises branch chain hexenes and straight chain amylenes, and the stream removed through conduit 30 comprises the acid and the branch chain amylenes. The temperature in contactor 31 is 60° F. With a third mixed stream comprising mixed butylenes flowing through conduit 32, the stream in conduit 33 comprises the branch chain amylenes and the straight chain butylenes, the branch chain butylenes being removed through conduit 34 with the acid. In stripper 35, the branch chain butylenes are removed through conduit 37 and the lean acid returned through conduit 36. In fractionator 37, the branch chain hexenes are separated from the straight chain amylenes while in the fractionator 38 the branch chain amylenes are separated from the straight chain butylenes. The pressure in contactors 23 27 and 31 is approximately 175 p.s.i.a.

*Example III*

As an example of the operation according to FIGURE 3 a mixed stream of catalytically cracked gasoline is fed through conduit 51 to fractionator 50. In fractionator 50 a butylene stream is taken overhead and the heavier material is taken through conduit 53 to fractionator 52. Here an amylene stream is taken overhead and the heavier material removed at the bottom. Lean sulfuric acid enters through conduit 61. From accumulator 54 the mixed amylenes pass through vessels 55, 56 and 57, becoming progressively leaner in branch chain amylenes and thus relatively richer in straight chain amylenes until a relatively pure straight chain amylene stream is removed as raffinate through conduit 72. The temperature in vessel 57 is 40° F. and the temperature in vessels 55 and 56 is 60° F. The lean acid becomes progressively richer in branch chain amylenes as it progresses from vessel 57 to vessel 56 to vessel 55 and a stream is removed through conduit 64 which is rich in branch chain amylenes and is fed to the butylene separation system. The stream which flows from accumulator 65 is predominantly mixed butylenes and becomes progressively leaner in branch chain butylenes and richer in branch chain amylenes, entering from line 64, as it progresses through vessels 66, 67 and 68. The temperature in vessel 68 is 40° F., in vessel 67

MATERIAL BALANCE, MOLS PER HOUR

|  | Feed | 10 | 13 | 14 | 16 | 17 | 18 | 20 | 21 | 40 | 41 | 42 | 43 | 44 | 45 | 46 |
|---|---|---|---|---|---|---|---|---|---|---|---|---|---|---|---|---|
| Propylene | 59 |  |  |  | 59 | 59 |  |  |  |  | 59 |  |  |  |  |  |
| Propane | 40 |  |  |  | 40 | 40 |  |  |  |  | 40 |  |  |  |  |  |
| Isobutane | 161 | 1 | 1 |  | 160 | 159 | 1 | 1 |  |  | 159 |  |  |  |  | 1 |
| Isobutylene | 92 | 1 |  | 1 | 91 | 10 | 80 | 78 |  |  | 10 |  |  |  |  | 78 |
| Butene-1 | 57 | 1 | 1 |  | 56 | 56 |  |  |  |  | 56 |  |  |  |  |  |
| N-butane | 87 | 3 | 3 |  | 84 | 84 |  |  |  |  | 84 |  |  |  |  |  |
| trans-butene-2 | 87 | 4 | 4 |  | 83 | 83 |  |  |  |  | 83 |  |  |  |  |  |
| cis-butene-2 | 71 | 4 | 4 |  | 67 | 67 |  |  |  |  | 67 |  |  |  |  |  |
| 3-methylbutene-1 | 9 | 2 | 2 |  | 7 | 7 |  |  |  | 3 | 4 | 3 | 3 |  |  |  |
| Isopentane | 130 | 128 | 127 | 1 | 2 | 3 |  |  |  | 2 | 1 | 2 | 2 |  |  |  |
| Pentene-1 | 16 | 16 | 16 |  |  |  |  |  |  |  |  |  |  |  |  |  |
| 2-methylbutene-1 | 50 | 49 | 4 | 9 | 1 | 9 |  |  |  | 8 | 1 | 8 | 8 |  |  |  |
| N-pentane | 27 | 27 | 27 |  |  |  |  |  |  |  |  |  |  |  |  |  |
| trans-pentene-2 | 37 | 37 | 37 |  |  |  |  |  |  |  |  |  |  |  |  |  |
| cis-pentene-2 | 19 | 19 | 19 |  |  |  |  |  |  |  |  |  |  |  |  |  |
| 2-methylbutene-2 | 90 | 90 | 38 | 80 |  | 69 | 4 | 4 |  | 69 |  | 73 | 73 |  | 4 |  |
| Heavies | 23 | 23 | 23 |  |  |  |  |  |  |  |  |  |  |  |  |  |
| Polymers [1] |  |  | 8 |  |  | 10 |  | 2 |  | 10 |  | 12 |  | 12 | 2 |  |
| Sulfuric Acid [2] |  |  |  | 60 |  |  | 60 |  | 60 |  |  |  |  |  |  |  |
| Water |  |  |  | 176 |  |  | 176 |  | 176 |  |  |  |  |  |  |  |
| Total | 1,055 | 405 | 314 | 327 | 650 | 656 | 321 | 85 | 236 | 92 | 564 | 98 | 86 | 12 | 6 | 79 |

[1] Basis is the mols of monomer.
[2] 100% concentration.

*Example II*

In an example of the operation according to FIGURE 2, the temperature in contactor 23 is 60° F. The first stream which is introduced through conduit 22 comprises mixed hexenes, and the stream entering through 24 is sulfuric acid, in which case the raffinate removed through line 26 comprises the straight chain hexenes while the is 70° F., and in vessel 66 is 90° F. The stream removed from vessel 68 through line 75 is predominantly branch chain amylenes and straight chain butylenes which are separated in fractionator 73. The stream removed through line 76 comprises the acid together with branch chain butylenes picked up in vessel 68 and a portion of the branch chain amylenes which entered with the acid through conduit 64. The stream removed through conduit 77 is richer in branch chain butylenes and leaner in amylenes and the stream which is removed through conduit 78 comprises the acid together with substantially all of the branch chain butylenes in the system and substantially all of the amylene has been removed. This stream flows through stripper 74 wherein the branch chain butylenes and the lean acid are separated and the lean acid from stripper 74 may be returned to the system through conduit 61. The pressure in all contacting vessels is approximately 175 p.s.i.a.

*Example IV*

Runs were made to demonstrate the selectivity of sulfuric acid for lower molecular weight branch chain olefins in preference to higher molecular weight branch chain olefins. In these runs, the hydrocarbon components were charged to a stainless steel vessel having means for stirring containing the acid. The contents were stirred for 10 minutes and then allowed to settle for 20 minutes, after which the hydrocarbon phase was analyzed by passing a sample from the hydrocarbon phase in the vessel directly through a chromatographic analyzer. Results are given in the following table:

EQUILIBRIUM TESTS FOR $H_2SO_4$-2 METHYLBUTENE-2-ISOBUTYLENE ISOBUTANE, 40° F.

|  | Charge | | Hydrocarbon Phase | | Acid Phase | |
| --- | --- | --- | --- | --- | --- | --- |
|  | Grams | Weight Percent | Grams | Weight Percent | Grams | Weight Percent |
| 2MB2 | 5.64 | 19.8 | 3.21 | 15.1 | 2.43 | 33.9 |
| iC₄⁻ | 5.92 | 20.8 | 1.18 | 5.55 | 4.74 | 66.1 |
| iC₄ | 16.9 | 59.4 | 16.9 | 79.4 | | |
| Total | 28.5 | | 21.3 | | 7.17 | |

Weight acid used, 35.5 grams (63.6 Weight Percent $H_2SO_4$).
Selectivity $(\beta) \frac{iC_4^-}{2MB2} = \frac{66.1}{5.55} \times \frac{15.1}{33.9} = 5.3$.

[Room temperature (78° F.)]

|  | Charge | | Hydrocarbon Phase | | Acid Phase | |
| --- | --- | --- | --- | --- | --- | --- |
|  | Grams | Weight Percent | Grams | Weight Percent[1] | Grams | Weight Percent |
| 2MB2 | 5.83 | 19.9 | 2.12 | 10.8 | 3.71 | 38.2 |
| iC₄⁻ | 6.12 | 20.9 | 0.11 | 0.58 | 6.01 | 61.8 |
| iC₄ | 17.35 | 59.2 | 17.35 | 88.6 | | |
| Total | 29.29 | | 19.58 | | 9.72 | |

[1] 1.0 mol percent unidentified in analysis, normalized out.
Weight acid used, 48.0 grams (63.6 Weight Percent $H_2SO_4$).
Selectivity = 30.1.

[120° F.]

|  | Charge | | Hydrocarbon Phase | | Acid Phase | |
| --- | --- | --- | --- | --- | --- | --- |
|  | Grams | Weight Percent | Grams | Weight Percent[1] | Grams | Weight Percent |
| 2MB2 | 5.61 | 20.1 | 3.70 | 17.6 | 1.91 | 27.5 |
| iC₄⁻ | 5.53 | 19.8 | 0.50 | 2.4 | 5.03 | 72.5 |
| iC₄ | 16.8 | 60.2 | 16.8 | 80.0 | | |
| Total | 27.9 | | 21.0 | | 6.9 | |

[1] 4.8 mol percent unidentified in analysis, normalized out.
Weight acid used, 38.8 grams (63.6 Weight Percent $H_2SO_4$).
Selectivity = 19.3.

This demonstrates the selectivity of sulfuric acid for isobutylene in preference to isoamylene.

*Example V*

A run was made in the same manner as the runs of Example IV, except that the amount of isoamylene was added to the acid prior to contact with the remainder of the hydrocarbon charge. Results are given below:

DISPLACEMENT DEMONSTRATION AT ROOM TEMPERATURE

Original Charge: 39.2 grams $H_2SO_4$ (63.6 Weight Percent)
9.80 grams 2MB2

|  | Grams | Weight Percent |
| --- | --- | --- |
| Displacing Liquid: | | |
| iC₄⁻ | 12.8 | 40.3 |
| iC₄ | 18.9 | 59.7 |
| Total | 31.7 | |
| Hydrocarbon Phase After Displacement: | | |
| 2MB2 | 3.52 | 14.2 |
| iC₄⁻ | 0.36 | 1.45 |
| iC₄ | 18.9 | 76.3 |
| Unidentified [1] | 2.0 | 8.1 |
| Total | 24.78 | |
| Acid Phase After Displacement: | | |
| 2MB2 | 6.28 | 33.6 |
| iC₄⁻ | 12.39 | 66.4 |
| Total | 18.7 | |

[1] Approximate.

This demonstrates the displacement of an isoamylene from an acid phase by contact with a mixed $C_4$ stream containing isobutylene.

Reasonable variation and modification are possible within the scope of the foregoing disclosure, the drawing and the appended claims to the invention, the essence of which is a process and apparatus by which a plurality of solvent extraction steps are accomplished with a single stripping step by utilizing the variation in selectivity with molecular weight as well as variation in selectivity between products of similar molecular weight but varying structure.

I claim:

1. A process for recovering isoolefins which comprises contacting a stream containing relatively high molecular weight olefins with sulfuric acid to obtain an olefin raffinate and an isoolefin-rich acid, contacting said isoolefin-rich acid with a stream containing relatively low molecular weight olefins separable by distillation from said high molecular weight olefins to obtain a raffinate containing relatively high molecular weight isoolefins in relatively low molecular weight olefin and a relatively low molecular weight isoolefin-rich acid, stripping said relatively low molecular weight isoolefin-rich acid to obtain lean acid and relatively low molecular weight isoolefin, separating said relatively high molecular weight isoolefin from said raffinate containing relatively high molecular weight iso- 2. A process for recovering isoolefins which comprises contacting a stream containing mixed amylenes with sulfuric acid to obtain an amylene raffinate and an isoamylene-rich acid, contacting said isoamylene-rich acid with a stream containing mixed butylenes to obtain a raffinate containing butylene and isoamylene and an isoamylene-rich acid, contacting said isoamylene-rich acid to obtain lean acid and isobutylene and separating said raffinate containing butylene and isoamylene to obtain butylene and isoamylenes.

3. A process for recovering isoolefins which comprises contacting a stream containing mixed hexenes with sulfuric acid to obtain a hexene raffinate and an isohexene-rich acid, contacting said isohexene-rich acid with a stream containing mixed amylenes to obtain a raffinate containing amylene and isohexenes, and an isoamylene-rich acid, contacting said isoamylene-rich acid with a stream containing mixed butylenes to obtain a raffinate containing butylene and isoamylenes and an isobutylene-rich acid, stripping said isobutylene-rich acid to obtain lean acid and isobutylene, separating said raffinate containing amylene and isohexenes to obtain amylene and isohexene and separating said raffinate containing butylene and isoamylenes to obtain butylene and isoamylene.

4. A process for recovering isoolefins which comprises contacting a stream containing relatively high molecular weight olefins with sulfuric acid at a temperature in the range of 20° to 120° F. to obtain an olefin raffinate and an isoolefin-rich acid, contacting said isoolefin-rich acid at a temperature in the range of 20° to 120° F. with a stream containing relatively low molecular weight olefins separable by distillation from said high molecular weight olefins to obtain a raffinate containing relatively high molecular weight isoolefin in relatively low molecular weight olefin and a relatively low molecular weight isoolefin-rich acid, stripping said relatively low molecular weight isoolefin-rich acid to obtain lean acid and relatively low molecular weight isoolefin, separating said relatively high molecular weight isoolefin from said raffinate containing relatively high molecular weight isoolefin and relatively low molecular weight olefin.

5. A process for recovering isoolefins which comprises contacting a stream containing mixed amylenes with sulfuric acid at a temperature in the range of 20° to 120° F. to obtain an amylene raffinate and an isoamylene-rich acid, contacting said isoamylene-rich acid at a temperature in the range of 20° to 120° F. with a stream containing mixed butylenes to obtain a raffinate containing butylene and isoamylene and an isobutylene-rich acid, stripping said isobutylene-rich acid to obtain lean acid and isobutylene and separating said raffinate containing butylene and isoamylene to obtain butylene and isoamylene.

6. A process for recovering isoolefins which comprises contacting a stream containing mixed hexenes with sulfuric acid at a temperature in the range of 20° to 120° F. to obtain a hexene raffinate and an isohexene-rich acid, contacting said isohexene-rich acid at a temperature in the range of 20° to 120° F. with a stream containing mixed amylenes to obtain a raffinate containing amylene and isohexene, and an isoamylene-rich acid, contacting said isoamylene-rich acid at a temperature in the range of 20° to 120° F. with a stream containing mixed butylenes to obtain a raffinate containing butylene and isoamylenes and an isobutylene-rich acid, stripping said isobutylene-rich acid to obtain lean acid and isobutylene, separating said raffinate containing amylene and isohexene to obtain amylene and isohexene and separating said raffinate containing butylene and isoamylenes to obtain butylene and isoamylene.

References Cited by the Examiner

UNITED STATES PATENTS

| 1,281,497 | 12/1961 | Cahn et al. | 260—677 |
| 3,113,163 | 12/1963 | Edwards et al. | 260—677 |

FOREIGN PATENTS 908,077  10/1962  Great Britain.

ALPHONSO D. SULLIVAN, *Primary Examiner.*

UNITED STATES PATENT OFFICE
CERTIFICATE OF CORRECTION

Patent No. 3,300,539　　　　　　　　　　　　　　　January 24, 1967

Fred T. Sherk

It is hereby certified that error appears in the above numbered patent requiring correction and that the said Letters Patent should read as corrected below.

Column 9, line 19, strike out "iso-" and insert instead -- isoolefin and relatively low molecular weight olefin. --; line 26, strike out "isoamylene", each occurrence, and insert instead -- isobutylene --; same line 26, for "contacting" read -- stripping --.

Signed and sealed this 10th day of October 1967.

(SEAL)
Attest:

Edward M. Fletcher, Jr.　　　　　　　　　　　　EDWARD J. BRENNER
Attesting Officer　　　　　　　　　　　　　　　Commissioner of Patents